Oct. 16, 1962    F. E. BENNER, JR., ETAL    3,059,035
CONTINUOUS PROCESS FOR PRODUCING METHYL CHLOROFORM
Filed Dec. 8, 1960
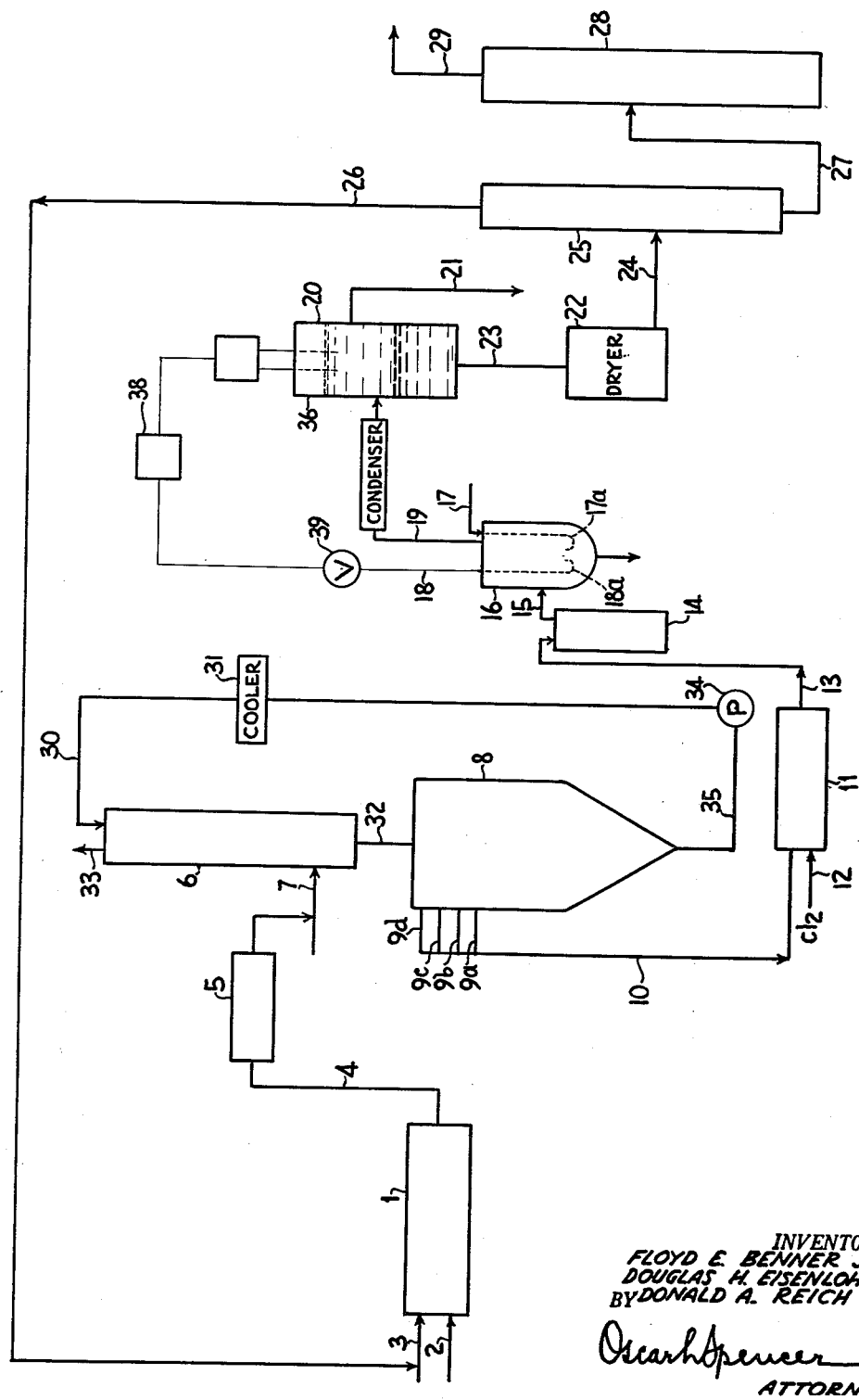
INVENTORS
FLOYD E. BENNER JR
DOUGLAS H. EISENLOHR and
BY DONALD A. REICH
*Oscar H Spencer*
ATTORNEY

United States Patent Office 3,059,035
Patented Oct. 16, 1962

3,059,035
CONTINUOUS PROCESS FOR PRODUCING METHYL CHLOROFORM
Floyd E. Benner, Jr., Wadsworth, and Douglas H. Eisenlohr and Donald A. Reich, Barberton, Ohio, assignors, by mesne assignments, to Pittsburgh Plate Glass Company
Filed Dec. 8, 1960, Ser. No. 74,505
6 Claims. (Cl. 260—658)

The present invention relates to the production of methyl chloroform. More particularly, the present invention relates to an integrated process for producing methyl chloroform by a combination of chlorination and hydrochlorination steps and the utilization of products formed in each of these steps.

Many methods have been devised for preparing methyl chloroform in the past. Thus, it has been proposed to directly chlorinate ethane to produce methyl chloroform. Methyl chloroform has also been produced by the liquid phase hydrochlorination of vinylidene chloride in the presence of a catalyst. While prior art processes successfully produce methyl chloroform, many objections to those processes are found which seriously detract from their desirability especially where commercial production of this desirable solvent material is desired. Thus, the processes described often involve batch type operations which do not lend themselves to commercial operations very easily. Quite frequently the methyl chloroform product obtained is heavily contaminated with catalytic material which upon purification of the desired product leads to decomposition of the desired product. In other instances, low yield of the desired product renders the process undesirable.

According to the present invention, many of the hereinabove mentioned undesirable features of the processes described by the prior art are eliminated and a methyl chloroform process is provided which lends itself readily to continuous operation. Methyl chloroform, in accordance with the teachings contained herein, is obtained in relatively high yields and separation and recovery of product is obtained in such a manner that little or no product is lost by decomposition. Still further, the process of the present invention is attractive from a commercial standpoint since it utilizes materials which are readily available and the process lends itself easily to continuous operation.

In accordance with the present invention, methyl chloroform is prepared by the direct chlorination of 1,1-dichloroethane at elevated temperatures. The direct chlorination of 1,1-dichloroethane produces a methyl chloroform-hydrogen chloride containing gaseous product stream. The methyl chloroform-hydrogen chloride containing gas stream is then reacted with a vinyl chloride vapor stream in the presence of a catalyst at temperatures which provide for reaction of the vinyl chloride and HCl to produce 1,1-dichloroethane. The resulting product stream containing 1,1-dichloroethane and methyl chloroform is then separated and the 1,1-dichloroethane is recovered from the methyl chloroform and utilized to produce further quantities of methyl chloroform by utilization thereof in the chlorination reaction.

Thus, as can be readily discerned from the above description, the process provides a continuous supply of 1,1-dichloroethane which is reacted with elemental chlorine at elevated temperatures to provide the methyl chloroform desired product. The other material fed to the system is vinyl chloride and the vinyl chloride feed stream is regulated to provide sufficient vinyl chloride to react with the hydrogen chloride produced in the chlorination reaction zone. The integration of the hydrochlorination reaction and the chlorination reaction thereby provides a methyl chloroform product from a vinyl chloride-chlorine feed system.

For a more complete understanding of the present invention, reference is made to the accompanying drawing, which is a diagrammatic illustration of a system which may be suitably employed to conduct the process as herein described.

As shown in the drawing, elemental chlorine is admitted to a reactor 1 through a feed line 2 while 1,1-dichloroethane is admitted to the same reactor through a line 3. Gases emerging from the chlorinator 1 are passed through a gas line 4, through a cooler 5, and the cooled gas stream is then admitted to a hydrochlorinating tower 6 through line 7. Vinyl chloride is admitted to the tower 6 through line 7 also. While the admission of the cooled gases from the cooler 5 is shown to be contiguous with the vinyl chloride admitted through line 7, it is to be understood that separate feed inlets for the vinyl chloride and the gases emerging from the cooler may be utilized if desired.

Situated below the hydrochlorinating contact tower 6 is a tank 8 which contains essentially methyl chloroform and 1,1-dichloroethane liquid having a Friedel-Crafts catalyst present therein, preferably ferric chloride. The tank 8 is provided with a series of outlets 9a, 9b, 9c, and 9d which all communicate with an outlet line (10). Located along the outlet line (10) is a chlorinating unit 11 provided with a chlorine inlet 12 and a liquid outlet 13. Liquids passing from the chlorinator 11 are admitted to the storage tank 14.

The material is removed from the storage area 14 through line 15 by suitable mechanical means such as by a pump (not shown) and introduced into the stripping pot 16. The stripping pot 16 is provided with an inlet 17 at the top thereof which is utilized for the admission of steam to the pot. Inlet 17 traverses the longitudinal axis of the pot and terminates in a U bend or dip leg (17a) located at a level just slightly above the bottom of the pot. Located in the pot is a second inlet 18 which contains a U bend or dip leg extension (18a) located slightly above the bottom of the tank and is utilized for the admission of gaseous ammonia to the pot. The gaseous products emerging from the pot are removed through a line 19 to a phase separator 20. The water layer of the phase separator is removed from the system through a line 21 and may be discarded such as by sewering. Located beneath the phase separator 20 is a dryer 22 and the organic liquids contained in the organic phase of the separator are passed through line 23 into the dryer and are subsequently admitted to a still 25 through line 24.

In the still 25, 1,1-dichloroethane and other materials boiling below methyl chloroform under column conditions are distilled from the methyl chloroform fraction and recirculated through lines 26 and line 3 to the chlorinator 1. The methyl chloroform fraction remaining as bottoms in the still 25 is transferred through line 27 to a product still 28 from which, as overhead, purified methyl chloroform is removed from the system.

As can be readily seen from an examination of the illustrative embodiment exemplified by the drawing, the process described is completely integrated and provides a methyl chloroform product of high purity utilizing chlorine and vinyl chloride as the feed material to the system. Substantial quantities of 1,1-dichloroethane are manufactured during the manufacture of the methyl chloroform and this provides one of the essential materials for the direct chlorination procedure to produce methyl chloroform taking place in the reactor 1. By proper correlation of the chlorine and vinyl chloride feed rates to the system balance of reactants is readily obtained and a methyl chloroform process readily adaptable for commercial operation on a continuous basis is easily provided.

Referring now more specifically to the various reactions and conditions prevailing in the system shown with reference to the chlorination reaction taking place within the overall system, the reactor (1) shown in the drawing is preferably a reaction vessel divided into two distinct zones. Typically the first zone of the reactor is a recycle chlorinator of the type described in the co-pending application of Douglas H. Eisenlohr, U.S. Serial No. 732,595 filed May 2, 1958, and now U.S. Patent No. 2,989,571. This reactor is normally coupled to a second chlorinator or reaction tube which is usually operated at a temperature somewhat higher than the recycle chlorinator.

Generally, in conducting the chlorinations in the chlorination reactor 1, chlorine is preheated to a temperature of approximately between 500° F. to 600° F. and is admitted to the reactor within this temperature range. The 1,1-dichloroethane admitted to the reactor is preferably at a temperature of about 225° F. to 300° F. The recycle portion or zone of the chlorinator is operated preferably at a temperature between about 550° F. and 650° F. Temperature control on the recycle section or zone of the chlorinator may be readily accomplished by suitably jacketing the reactor and circulating boiling Dowtherm (an eutectic mixture of diphenyl and diphenyl oxide manufactured by the Dow Chemical Company) or other suitable heat exchange material in a reactor jacket. Gases emerging from the recycle portion of the chlorination reactor are introduced into the soaker portion of the reactor which is maintained at a temperature between 700° F. and 900° F., preferably 750° F. to 800° F. Once again, temperature control may be accomplished by jackets surrounding the soaker section of the chlorinator and careful regulation of jacket temperatures. Generally, the second or soaking portion of the chlorinator is operated at a temperature at least 50° F. and usually 70° F. to 100° F. higher than the recycle portion of the chlorinator. This provides for substantially complete consumption of the residual chlorine emerging from the recycle chlorination and typically the reactor gases leaving the soaker contain between 0.1 and 0.7 percent chlorine by volume therein.

Reactor gases emerging from the chlorinator are admitted to the cooling device or heat exchanger 5 which is preferably a brine-cooled condenser. The gases or vapors admitted to the tower are usually at a temperature about 50° F. and the condenser typically is operated to provide a gas stream entering the tower at a temperature preferably somewhere between 35° F. and 60° F.

The vinyl chloride admitted to the tower through line 7 is admitted as a vapor at a temperature of between 20° F. and 90° F., preferably between 35° F. and 60° F. If desired, heat exchanger 5 may be by-passed and both the product gas stream and vinyl chloride admitted to the hydrochlorinator at temperatures of up to 200° F. Conversely, both gas streams may be cooled to as low as 0° F.

The vapors of HCl, vinyl chloride, methyl chloroform and other chlorinated organics present are introduced to the tower 6 and encounter therein a downwardly falling liquid stream containing ferric chloride or other Friedel-Crafts type catalyst therein. The liquid catalyst body entering the column through line 30 is previously cooled in a heat exchanger 31 and enters the column at a temperature usually on the order of 50° F. to 120° F. Hydrochlorination of the vinyl chloride takes place in the column and the hydrochlorinated material is removed from the column 6 through line 32 and passed into the tank 8. Preferably on a continuous basis, a portion of the liquid contained in the tank is withdrawn from the tank through line 35 and pumped by the pump 34 through the heat exchanger 31 where its temperature is regulated between 50° F. and 120° F. The liquid after cooling is then introduced into the column 6.

The auxiliary chlorinator 11 is employed to provide for a clean-up chlorination of unsaturated chlorohydrocarbons which may emerge from the tank 8 through line 9 and while not essential to the overall process does contribute to the overall recoveries of desired products where hydrochlorination in the tower 6 is incomplete and quantities of unsaturated chlorohydrocarbons being to appear in the product stream issuing from the tank or where large quantities of materials of this character have been produced in the chlorination zone and carried along with the product gases.

The pot 16 is operated to provide vapor temperatures of between 170° F. and 215° F. The vapors removed from this pot through line 19 are totally condensed by providing a suitable condenser 36 operated at a temperature of between 80° F. and 120° F. to provide for complete condensation of all the gaseous materials removed from the pot through line 19. A phase separator 20 is utilized to separate the total condensate of the gases condensed in the condenser 36 into organic and aqueous phases and is equipped with a pH meter 37 which records or indicates the pH condition of the aqueous phase of the overhead condensate. The admission of ammonia to the pot 16 is regulated by correlating the indications of the pH meter connected to the water phase of the phase separator continuously or intermittently. The pH meter is conveniently linked mechanically to a pH recorder-controller 38 of conventional design which is, in turn, linked mechanically to the ammonia control valve 39 thereby providing a control of the ammonia addition to the stripping pot which, in turn, secures the obtaining of aqueous materials in the phase separator having a pH in the range of 6 and 11. Deviations from the desired pH range indicated by the meter are immediately compensated for by the addition or reduction in the quantities of ammonia admitted to the pot 16 until the desired pH range is once more secured. Gaseous ammonia is utilized to effect the pH control of the product liquid chlorohydrocarbons recovered from the pot 16 and is conveniently admitted to the pot at a temperature of somewhere between 50° F. and 90° F. Pot 16 normally operates at atmospheric conditions of pressure but pressures above atmospheric may be employed, if desired. When super atmospheric pressure is employed, of course corresponding changes in temperatures take place.

Dryer 22 may comprise any suitable dryer apparatus suitable for use with chlorinated organic liquid materials. Preferably, applicants employ dryers in which calcium chloride forms the desiccant though other desiccants may be utilized.

The separation or lights still 25 is operated to provide a bottoms temperature of between 175° F. and 200° F. and an overhead temperature of between 125° F. and 140° F. Thus, in operating still 25, conditions are regulated so as to provide an overhead of 1,1-dichloroethane and all other like materials boiling at a temperature below the boiling point of methyl chloroform, that is, 165° F., while the higher boiling materials remain as bottoms. Column 28 is regulated with bottom temperatures between 190° F. and 220° F. and an overhead temperature of 161° F. to 167° F. Operation in this manner under atmospheric conditions of pressure results in the obtaining of high purity methyl chloroform from the column 28 while higher boiling chlorinated organics which may be present remain behind. If pressure is desired or vacuum operation is desired in the still columns, it is, of course, to be understood that changes in temperature corresponding to the change in the pressures above or below atmospheric conditions will be necessitated.

The proportion of chlorine to 1,1-dichloroethane fed to the chlorinating reactor or chlorination zone may be varied considerably but generally is maintained in the range between 0.9 to 0.3 mole of chlorine per mole of 1,1-dichloroethane admitted to the chlorination reaction zone. Preferably, the chlorine feed is maintained to provide a half mole of chlorine for each mole of 1,1-dichloroethane fed.

As will be readily understood, once the process is in operation and dichloroethane is produced in the hydrochlorination zones the dichloroethane so produced and returned to the chlorination zone usually carries with it other chlorohydrocarbons formed by the various reactions. Thus, normally, dichloroethane feed to the chlorination zone contains between 2 percent and 20 percent by weight chlorinated organics other than dichloroethane. These are typically light boiling hydrocarbon chlorides such as cis- and trans-dichloroethylenes, vinyl chloride, vinylidene chloride, methyl chloroform, and the like. Feed to the chlorination zone may therefore be adjusted in accordance with the impurities contained in the dichloroethane feed stream to provide the desired molar feed of chlorine per mole of dichloroethane actually being fed to the zone.

The feed gases or vapors fed to the hydrochlorination tower are regulated to provide a vinyl chloride feed which represents 1 mole of vinyl chloride for each mole of HCl carried in the organic stream issuing from the chlorination reactor. Conveniently, the hydrochlorination reaction may be controlled by observation of excessive pressure build-up in the tower. Large quantities of unreacted HCl or vinyl chloride cause an increase in pressure in the tower which normally is operated at 3 pounds per square inch gauge. Any significant increase in the pressures, i.e., 2 or more pounds per square inch gauge, indicates an abnormal condition in the hydrochlorination zone. Excess HCl or vinyl chloride gives rise to this condition or decreased catalytic activity and a consequent reduction in reaction rate can also cause it. An analysis of liquid hydrocarbon removed from the hydrochlorination zone or tower may be conducted to determine the presence of vinylidene chloride and vinyl chloride and other unsaturated hydrocarbon chlorides. Any substantial quantity of these unsaturated chlorinated hydrocarbons is indicative of poor hydrochlorination reaction or an abnormal condition in the hydrochlorination zone. Adjustment of feed rates of the vinyl chloride and HCl may be undertaken under any such abnormal conditions to bring the system to proper operating conditions and should this fail to fully compensate for the abnormality of operation the catalyst may be strengthened by the addition of further active catalyst to the system. In the hydrochlorination tower, the vinyl chloride and hydrogen chloride are reacted to produce 1,1-dichloroethane which falls into the tank situated below the column and is utilized in part as a quenching liquid in the tower and in part as a product stream from which methyl chloroform is recovered and 1,1-dichloroethane is recycled to the chlorination zone.

The circulating liquor pumped from the tank 8 through the heat exchanger 31 and into the tower 6 is maintained within a range sufficient to provide a tower temperature somewhere in the neighborhood of between 60° F. and 100° F. The admission of the catalyst to the system may be accomplished in any suitable manner though preferably catalyst is admitted to the system by providing a suitable inlet in the line 30 and admitting catalyst to the circulating liquor contained therein to provide the desired quantity.

For a more complete understanding of the present invention, reference is made to the following example which is illustrative of one mode of operating the process according to the instant invention:

EXAMPLE

A nickel cylindrical tube 24 inches in diameter and 15.5 feet long was employed as the recycle section of the chlorinator. The inlet of the recycle portion of the reactor was equipped with a nicket blast nozzle 3 feet in length which had attached to the downstream end a tapered nickel tube 6⅛ inches in diameter at the point of attachment to the nozzle and 16 inches in diameter at a point 6½ feet from the end of the nozzle. The tube from this 16 inch diameter point extended 5 feet to a point 1 foot from the end of the reactor. The entire recycle section of the reactor was jacketed along 10.5 feet of its external surface with a 28 inch internal diameter steel jacket. Flue gas was utilized to supply heat to the walls of the recycle reactor. The end of the recycle portion of the chlorinator was covered with a baffle plate 24 inches in diameter and spaced 11 inches therefrom another baffle plate 24 inches in diameter was utilized to cover the inlet end of the soaker. Both baffle plates were connected to each other by means of a nickel tube 11 inches long and 24 inches in diameter. Both baffle plates were drilled with circumferentially-spaced 6½ inch diameter holes.

A second reactor was connected with the recycle reactor and was constructed of nickel pipe 13.6 feet in length and having an internal diameter of 24 inches.

The second reactor or section of the chlorinator was completely surrounded by a jacket heated with hot combustion gases to provide temperatures within the reactor of between 700° F. and 900° F.

The outlet end of this second portion of the chlorinator was connected to a brine-cooled condenser and the outlet of the condenser was connected to the bottom of a steel column. The column was fabricated of mild steel and had an internal diameter of 2 feet 6 inches with 24 baffle trays 8 inches apart placed therein and was 18 feet in height. An opening in the bottom of the column was connected to the top of a conical-bottomed tank having an overall capacity of 5,000 gallons. Several lines were located in the upper portion of the tank and connected to suitable openings located 5, 10, 45 and 75 inches from the top of the tank. These discharge lines or conduits communicated with a common outlet or discharge line. An additional gas inlet for the introduction of vinyl chloride is located in the bottom of the column.

The outlet or discharge line terminated at the top of a 500 gallon jacketed steel pot. The pot was equipped with two steel pipes, which traversed the entire length of the pot and terminated at a point a few inches from the bottom of the pot in a U shape. An overhead discharge line from the pot was connected to a condenser and a phase separator. The phase separator in turn was connected at the bottom portion thereof to a drying tower 1 foot 11¼ inches in internal diameter and 10 feet long, cylindrical in shape and filled with calcium chloride flakes throughout 6 feet of its length. An outlet line was located at the bottom of the drying tower and is connected to the mid portion of a still having an internal diameter of 24 inches, being 119 feet in height, and possessing 92 sieve trays therein. The bottom discharge line of the still was connected to a second still having an internal diameter of 24 inches and a height of 43 feet. This second nickel-clad steel column was packed with ½ inch ceramic rings throughout 37 feet of its total height and was provided at its uppermost portion and the cover thereof with an 8 inch internal diameter steel product discharge line. The overhead discharge line from the first still was physically connected to an inlet line at the inlet end of the recycle section of the chlorinator. A second line was provided at the inlet end of the chlorinator for the admission of elemental chlorine thereto. The hydrochlorination tower was also provided with an inlet line for the admission of vinyl chloride thereto.

Utilizing the train as described before, methyl chloroform was prepared by filling the hydrochlorinator tank to a depth of 10 inches with a liquid mixture of methyl chloroform and 1,1-dichloroethane containing 3 weight percent $FeCl_3$. The jackets of the chlorinating system were controlled by suitable heating to provide temperatures in the recycle portion of between 420° F. to 700° F. and the soaking portion between 700° F. and 900° F. Liquid was admitted to the pot at a temperature of 70° F. and gaseous ammonia and steam admitted thereto and the temperature regulated at bottom of the pot to provide an overhead temperature of between 170° F. to 215° F.

The organic liquid discharge from the phase separator connected to the overhead discharge line of the pot was admitted after passage through the calcium chloride dryer to a first still operating at a bottoms temperature of about 185° F. and a top temperature of about 134° F. under atmospheric conditions of pressure. The 1,1-dichloroethane removed from the top of the first still was admitted through the recycle portion of the chlorinating system and chlorine in a quantity representing 0.47 mole of chlorine for each mole of 1,1-dichloroethane fed was admitted to the chlorinator. The gaseous discharge from the chlorinator was cooled by the brine-cooled condenser located in the outlet vapor line issuing from the chlorinator and vinyl chloride was added thereto in quantities representing equimolar proportions with respect to the hydrogen chloride concentration of the gaseous stream issuing from the heat exchanger. This gaseous mixture was admitted to the upper portion of the hydrochlorination system in the tower section and showered down upon it was a liquid stream of catalyst-containing hydrocarbon chlorides circulating from the bottom of the tank to the top of the tower. Typically a liquid mixture of methyl chloroform and 1,1-dichloroethane containing ferric chloride catalyst therein and maintained at a temperature of 70° F. is the hydrocarbon chloride catalyst-containing medium.

Liquid discharge from the bottom of the first still was admitted to a second still column operating with a bottoms temperature of 200° F. and a top temperature of 164° F. to provide a methyl chloroform product. Operating in this manner for several runs, chlorine and vinyl chloride were admitted to the system in the quantities set forth below in Table I and the methyl chloroform product recovered therefrom:

*Table I*

| Run No. | Feed, Lbs. Per Day | | Products, Lbs. Per Day | | Yield,[1] MC, MC+ Heavies |
|---|---|---|---|---|---|
| | Cl₂ | Vinyl Chloride | Methyl Chloroform | 1,1-Dichloroethane | |
| 1 | 7,095 | 13,400 | 13,055 | 5,870 | 76.8 |
| 2 | 7,244 | 8,800 | 10,750 | 2,090 | 88.2 |
| Total | 14,339 | 22,200 | 23,805 | 7,960 | 80.9 |

[1] Yield is calculated by using average compositions for increases in working crude to determine total production of methyl chloroform, 1,1-dichloroethane, and heavies. The 1,1-dichloroethane was converted to an equivalent weight of methyl chloroform. Methyl chloroform divided by total of methyl chloroform and heavies equals yield.

As can be readily seen from the above example, operating the integrated system herein described, an extremely efficient process is provided for the production of methyl chloroform from a system employing as basic feed materials elemental chlorine and vinyl chloride. The advantages of the system lie primarily in the ease with which methyl chloroform is produced in good yields and the fact that the process utilizes materials which are readily available commercially at low cost. Basic materials required to produce the reactions giving rise to the product methyl chloroform are produced during the operation of the hydrochlorination step, that is, when 1,1-dichloroethane is formed in situ, and the reaction between this produced material and the elemental chlorine fed to the system gives rise to a methyl chloroform product of high purity containing little or no catalyst therein.

While the invention has been described with reference to a specific example and diagrammatical illustrations, it is to be understood that the invention is not to be limited thereby except insofar as appears in the accompanying claims.

We claim:

1. A method of producing methyl chloroform comprising introducing elemental chlorine and a vapor stream containing 1,1-dichloroethane into a first chlorination zone, thoroughly mixing and reacting the elemental chlorine and 1,1-dichloroethane vapors in the chlorination zone to form HCl and methyl chloroform at a temperature of between 420° F. and 700° F., introducing the gaseous reactants containing HCl from the first chlorination zone to a second chlorination zone operating at a temperature at least 50° F. higher than said first chlorination zone and up to 900° F., removing the gaseous material from the second chlorination zone, introducing said material to a hydrochlorination zone operating at a temperature of 50° F. to 120° F., introducing vinyl chloride to said hydrochlorination zone in an amount sufficient to react with the HCl present to thereby provide a 1,1-dichloroethane-methyl chloroform liquid mixture, removing at least a portion of the methyl chloroform-1,1-dichloroethane liquid mixture, simultaneously neutralizing and steam distilling said mixture to provide a methyl chloroform-dichloroethane product, drying said liquid mixture and subjecting it to fractional distillation to provide a methyl chloroform bottoms and a 1,1-dichloroethane overhead, feeding the 1,1-dichloroethane overhead to the first chlorination zone, and recovering methyl chloroform from said bottoms.

2. The method of claim 1 wherein the elemental chlorine to 1,1-dichloroethane ratio fed to the chlorination zone is maintained between 0.3 and 0.9.

3. The method of claim 1 wherein the vinyl chloride to HCl ratio fed to the hydrochlorination zone is maintained between 0.9 and 1.1.

4. The method of claim 1 wherein the temperature of said second chlorination zone is between 700° F. and 900° F.

5. The method of claim 1 wherein the temperature of the hydrochlorination zone is maintained between 50° F. and 120° F. by admitting to the top portion of the column a liquid 1,1-dichloroethane-methyl chloroform mixture at a temperature of 50° F. to 120° F.

6. The method of claim 1 wherein the gaseous products admitted to the hydrochlorination zone are maintained at a temperature below about 200° F.

No references cited.